Oct. 18, 1938.  E. R. BLACK  2,133,683
BUILDING COVERING
Filed Oct. 24, 1935    3 Sheets-Sheet 1
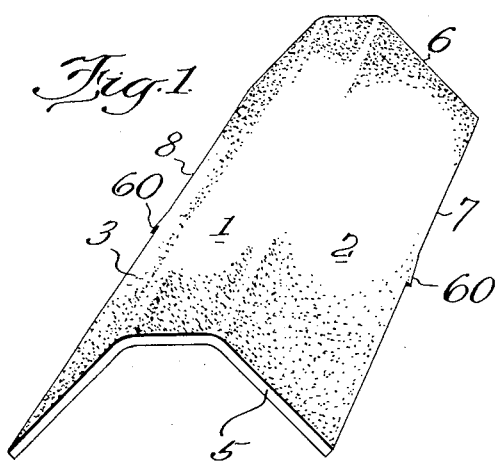
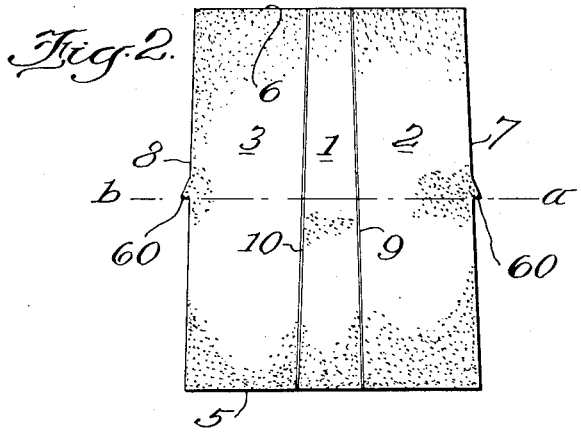
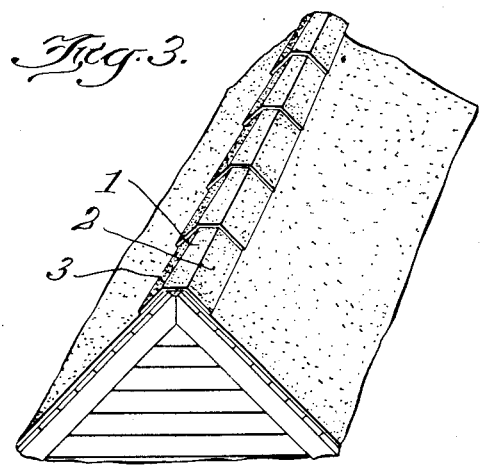
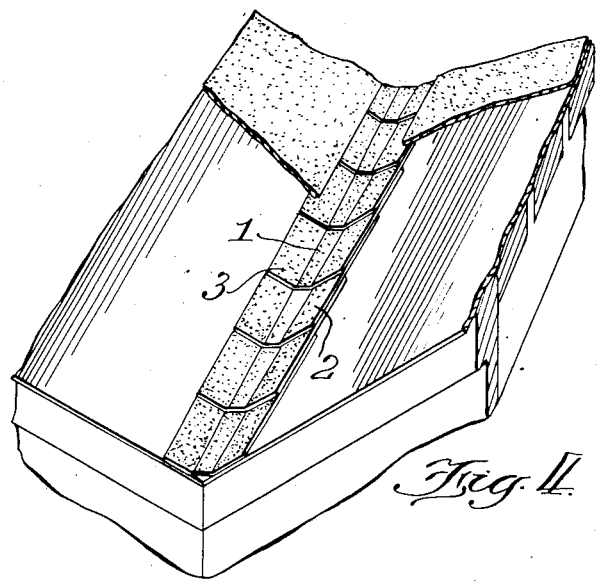
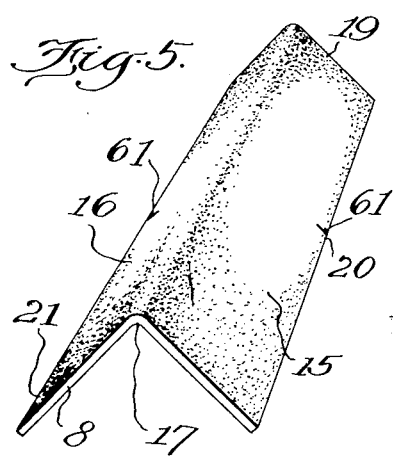
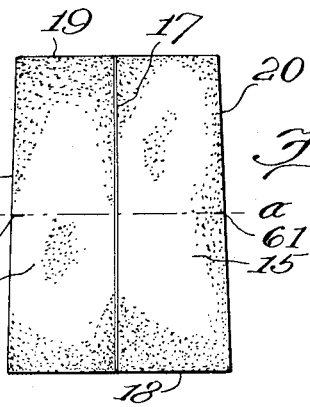
Inventor:
Edward Roscoe Black
By Williams, Bradbury, McCaleb & Hinkle
Attys.

Oct. 18, 1938.  E. R. BLACK  2,133,683
BUILDING COVERING
Filed Oct. 24, 1935  3 Sheets-Sheet 2
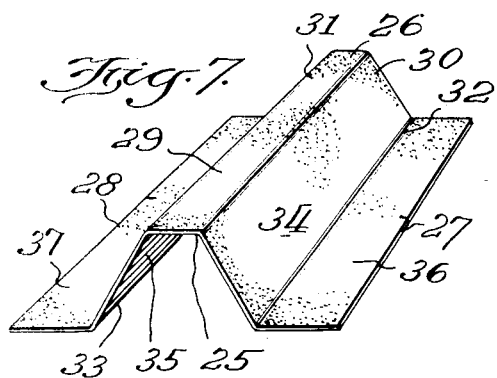
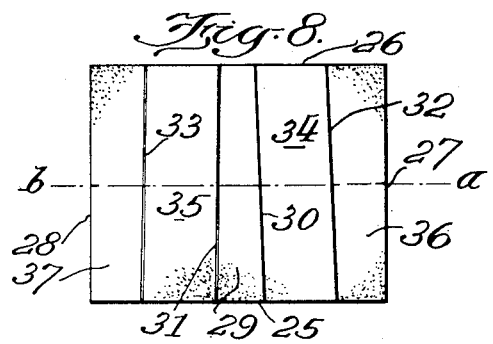
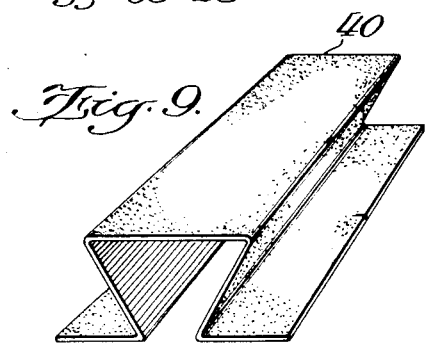
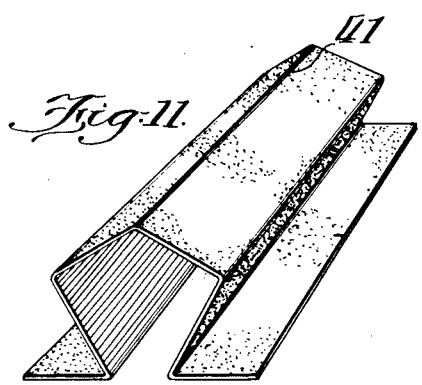
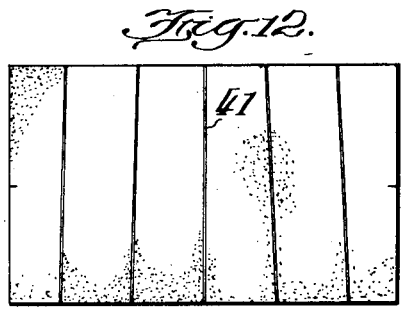
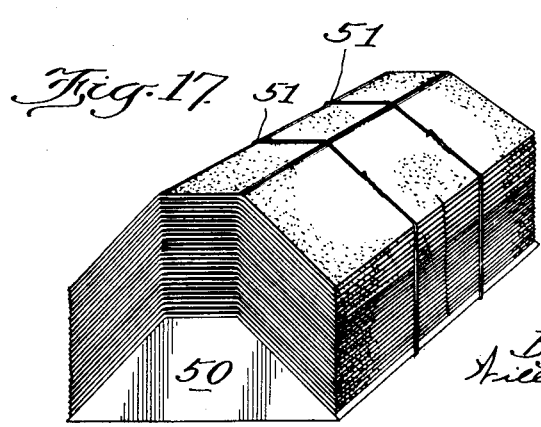
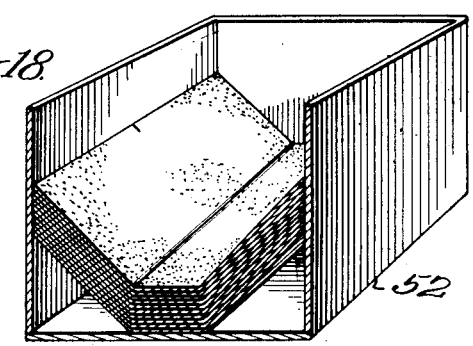
Inventor:
Edward Roscoe Black Oct. 18, 1938.   E. R. BLACK   2,133,683
BUILDING COVERING
Filed Oct. 24, 1935   3 Sheets-Sheet 3
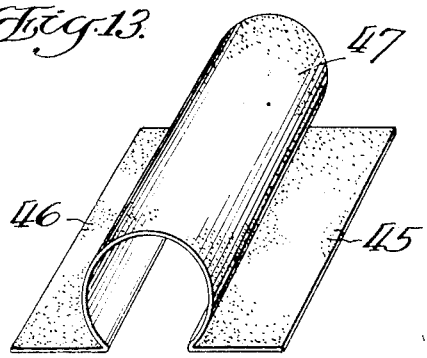
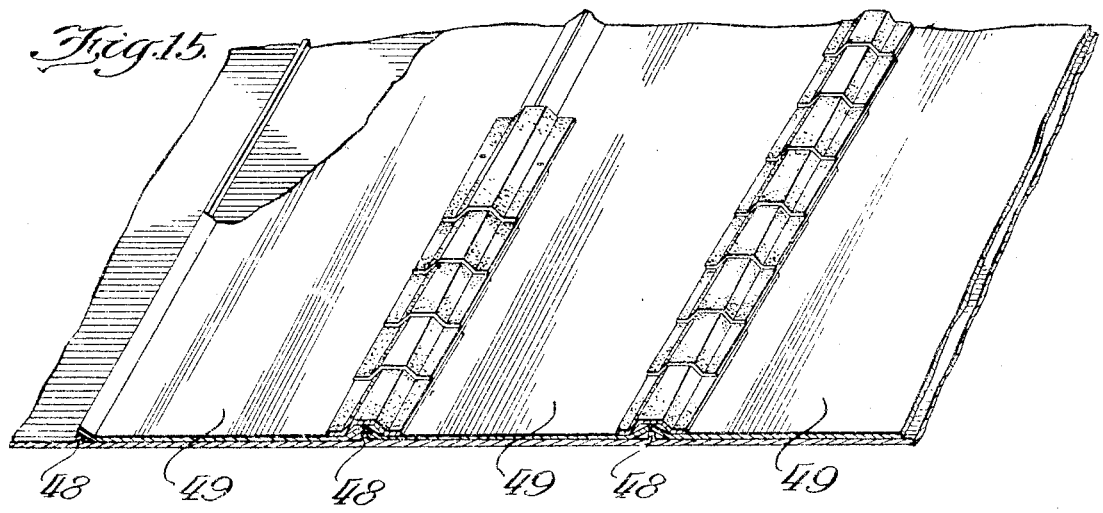
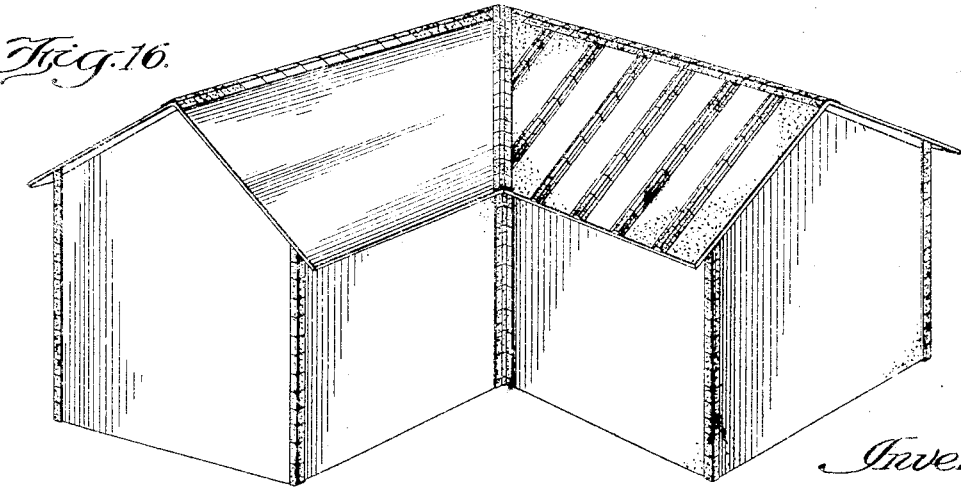
Inventor
Edward Roscoe Black
By Williams, Bradbury, McCaleb & Hinkle
Attys.

Patented Oct. 18, 1938

2,133,683

UNITED STATES PATENT OFFICE 2,133,683

BUILDING COVERING

Edward Roscoe Black, Chicago, Ill., assignor to Black Systems, Inc., Chicago, Ill., a corporation of Illinois Application October 24, 1935, Serial No. 46,524

3 Claims. (Cl. 108—24)

My invention relates to building coverings.

More particularly it relates to covering units adapted for application along the corners of buildings,—corners which may be either outwardly directed, such as roof ridges, or inwardly directed, such as roof valleys.

For years it has been common practice to cover the outside walls and roofs of buildings with what is generally termed "prepared roofing", composed of substantially uniform thick sheet material, such as asphaltum impregnated paper stock or "felt". Sometimes such prepared roofing is provided with a protective and decorative coating of crushed stone or other resistant material, and sometimes it is used uncoated or plain. One inherent characteristic of such "prepared roofing" is that it is not self-sustaining at normal temperatures; that is, it does not retain bends formed therein, but tends to flatten. Another characteristic is that, while it may be bent relatively easily while warm, it can be bent with increasing difficulty as its temperature is lowered.

Such prepared roofing is supplied in units which may be in the form of individual or multiple shingles or in long strips commonly called "roll roofing". And whether the units employed have been individual or multiple shingles or roll roofing, it has been the practice to cover the corners of the buildings (such as the ridges or the roof valleys) in one of two ways,—either with a strip of the roll roofing or with overlapped shingles similar to those constituting the rest of the covering. With either practice it has been the custom to bend the strips or shingles "on the job" to try to have them conform to and fit over or within the angles of the corners.

Such expedients are unsatisfactory for a number of reasons. Thus, with either practice, the bending of the strips or shingles on the job to cause the same to fit the corners, is detrimental to the units and frequently is not done easily or properly. For example, the tendency of the material composing the units to become hard and brittle, particularly during the cooler seasons or time of day, causes it to bend with difficulty and with danger of cracking and fracture at the line of the bend. The lines of fracture constitute lines of weakness where the covering may fail in a relatively short time. The breaking and exposure of the fibres permit the relatively rapid drying out (i. e., loss of asphaltum) with the result that the units soon become weakened and more easily loosened from the fastenings and blown from the roof or wall. Not infrequently the cracks may be deep enough practically to create more or less open fissures through which moisture may penetrate to cause leaks. Furthermore, when the corners are covered with overlapping shingles of uniform thickness, the adjacent edges of the overlapped and overlapping units do not register or align, detracting from the appearance of the covering at the corners.

One of the objects of my invention is to provide preformed corner units which, in spite of the inherent tendency of the material to flatten, will be received on the job in properly bent condition to fit corners.

Another object is to provide pre-formed corner units of prepared roofing material which are shaped to compensate for the overlapping so as to insure proper alignment of edges when they are overlapped.

Another object is to provide a method of preparing pre-bent corner units from normally flexible material and insuring that they arrive on the job in pre-bent condition.

Another object is to provide corner units from flexible prepared roofing material wherein acute bends, such as would injure the material, may be avoided.

Other objects and advantages will hereinafter appear.

The accompanying drawings illustrate several forms of corner units, picture typical methods of applying them to corners, and show suitable arrangements for insuring the retention of the desired pre-bent shape until they are laid.

In the drawings:

Fig. 1 is a perspective of one form of corner unit having two corners or bends;

Fig. 2 is a top plan of a blank of roofing material from which the unit shown in Fig. 1 is formed;

Fig. 3 shows a typical outwardly directed or convex corner, such as a roof ridge installation, employing the form of unit illustrated in Figs. 1 and 2;

Fig. 4 is a typical inside or concave corner installation, such as a roof valley, part of the flat-surface covering being removed to show how the edges of the corner units underlie the same;

Fig. 5 is a perspective of another form of corner unit having only one corner or bend;

Fig. 6 is a top plan of the blank for forming the unit shown in Fig. 5;

Figs. 7—8, 9—10, 11—12, and 13—14 are respectively perspective views of units and top plans of blanks for other forms of units;

Fig. 15 is a typical installation showing corner units employed to cover the upstanding seams of a tin roof or side wall;

Fig. 16 shows a building, on the side walls and roof of which corner units are employed at inside and outside corners and over seams on the flat surfaces of the roof;

Fig. 17 shows one arrangement for retaining the units in pre-bent condition, and Fig. 18 shows another arrangement for retaining the units in pre-bent condition.

The corner unit shown in Fig. 1 has a flat tapering mid section 1 flanked at opposite sides by flat rectangular inclined sections 2 and 3. The angles between the mid, or what may be termed the truncating section, and the flanking, or what may be termed the wall engaging sections are such that, with the mid section resting on the apex of the corner to be covered, the two flanking sections will be inclined therefrom at substantially the slope of the sides of the roof or wall forming the building corner. In other words, the angle at which the inclined sections 2 and 3 slope toward each other is substantially the angle of the corner to be covered although the mid and flanking sections are jointed together at angles less acute than the angle of the corner. The unit is formed from a quadrilateral blank such as shown in Fig. 2 having two straight parallel end edges 5 and 6 and two straight side edges 7 and 8 which converge toward each other from the edge 5 to the edge 6. This longitudinally tapering unit-blank of the desired size for easy handling and application and to insure a good appearance when laid, is cut from a piece of flexible prepared roofing of the desired uniform thickness. While the blank is still warm enough to bend easily, accurately and without danger of fracture, it is bent along two lines 9 and 10 which extend between the two parallel end edges 5 and 6 and converge toward each other from edge 5 to edge 6 at substantially the same angle as the side edges 7 and 8 converge toward each other. Thus, the sides of the tapering mid or truncating section are defined by the lines of bend 9 and 10 and the rectangular flanking or wall engaging sections are defined by the opposite lines of bend and the edges 7 and 8 respectively.

The angle at which edges 7 and 8 and the bend lines 9 and 10 converge toward each other, in order to insure proper alignment of the adjacent edges of overlapping and overlapped units should be such that at and along the lap line (i. e., the line parallel to its end edges to which a unit will be overlapped by the next succeeding unit) the length of the outer surface of the unit will substantially equal the length of the inner surface of the unit along the edge at the larger end. The amount or degree of taper depends, strictly speaking, upon the thickness of the material composing the units, upon the angle of the corner to which the unit is to conform when in position, and upon the region or line between the end edges 5 and 6 which marks the amount the unit overlaps and is overlapped by two adjacent units, i. e., the length of butt exposure or, as it is often termed, the "length to the weather". For all practical purposes, however, I have found that for the range of corner angles usually encountered, the difference in angularity may be disregarded; in other words, that only the thickness of the material and the length of area to be exposed need be taken into account. Thus, referring to Fig. 2, if the length or area from the edge 5 to the line $a-b$ is to be exposed when the unit is laid, then the edges 7—8 should converge (i. e., the unit taper from butt to tip) so that the width at $a-b$ is twice the thickness of the material less than the width along edge 5, i. e., the butt width. For example, if the butt width of the unit is 12″ and the material is ⅛″ thick, the width of the unit at the lap or exposure line $a-b$ should be approximately 11¾″. Of course, the lines of bend 9 and 10 should converge by the same amount so as to remain parallel to the edges 7 and 8 respectively.

Corner units may be formed from such blanks by bending them along the bend lines 9 and 10 so that, as previously stated, the two flanking sections 2 and 3 are angularly related to each other at substantially the angle of the corner to be covered. If the units are to be used to fit over and cover outwardly directed or convex corners, such as a roof ridge, they are bent along the converging lines of bend 9—10 so that the protective coating is on the convex side, as shown in Fig. 1. If, on the other hand, they are to be used to fit within and cover an inwardly directed or concave corner, such as a roof valley, they should be bent along the converging lines 9—10 in the reverse direction so that the coated side forms the concave surface of the unit.

The laying of what may be termed convex units (i. e., those having the protective coating on the convex surface) upon an outwardly directed corner such as a roof ridge, is illustrated in Fig. 3. Thus, beginning at one end of the ridge, say the left-hand end, the convexly bent (i. e., coating on the outside) units are successively laid with the wider edges at the left and constituting the exposed or what is generally termed the butt edge. Each unit except the first overlaps, with its wider or exposed part, the narrower concealed part of the preceding unit down to the lap line $a-b$, and each except the last is overlapped down to its lap line $a-b$ by the succeeding unit. Each unit as it is laid may be anchored in place by suitable means, such as ordinary roofing nails driven through the body between the tip and lap line so that when the succeeding unit is laid over it the fastening will be covered. In this way the wider portions of each unit are exposed, the narrower portions of each down to its lap line being nested or telescoped within and covered by the wider portion of the succeeding unit. And because of the taper, the edges of the overlapped and overlapping portions of adjacent units substantially register or align.

The laying of what may be termed concave units (i. e., those having the protective coating on the concave surface) within an inwardly directed corner, such as a roof valley, is illustrated in Fig. 4. In such a situation the units are laid in the manner previously described except that the smaller end of each is at the lower end and constitutes the exposed or butt edge.

Fig. 5 shows a corner unit having only one angle and two sections. Such units may be formed and used where the material is thin and flexible enough to permit its being bent, without danger of rupture or undue weakening, at an angle sufficiently sharp or acute to conform to the corner to be covered. Such a unit may be formed from a blank like that pictured in Fig. 6.

The unit has two flat tapering sections 15 and 16 which converge to an apex or line of bend 17. It is formed from a quadrilateral blank having two parallel end edges 18 and 19 and two converging side edges 20 and 21. The line of bend 17 extends between the end edges 18 and 19 and equidistant from the converging side edges 20 and 21. The taper of the unit like that previously described should be such that the width at the lap line *a—b* is twice the thickness of the material less than the width at the edge 18. Blanks of this variety are bent along the line 17 with the coated surface on the convex side when outwardly directed corners are to be covered and with the coated surface on the concave side when inwardly directed corners are to be covered. The finished units are laid in the same manner as explained with reference to the form shown in Figs. 1, 3 and 4.

When it is desired to cover corners rising from and extending along the flat surfaces of roofs or walls, it will be found necessary to provide the units with additional sections or skirts which can lie flat upon the roof or wall and serve to receive the attaching means, such as roofing nails. Several forms of such units and the blanks from which they may be formed are shown in Figs. 7—8, 9—10, 11—12, and 13—14. A typical use for such units is shown in Fig. 15, wherein a so-called "tin roof" is covered by strips of roll roofing and the upright seams which join the strips of the old metal covering are covered by my corner units.

In order that the outer edges of overlapping units of this skirted type may align or register, it is necessary that the skirts taper to compensate for the taper of the midsection, i. e., taper by the same angles, but in the reverse direction. Consequently, such units are formed from substantially rectangular blanks rather than from tapering ones.

Thus, referring particularly to Fig. 8, the blank from which the unit shown in Fig. 7 is formed is a rectangle having parallel front and rear edges 25 and 26 and parallel side edges 27 and 28. The flat midsection 29 is defined by two lines of bend 30 and 31 which converge toward each other from one to the other end of the unit. The angle or amount of taper is such that at the lap lines *a—b* the width of the midsection is substantially twice the thickness of the material less than its width at the edge 25. Converging lines of bend 32 and 33 define the outer edges of the sloping sections 34 and 35 and the inner edges of the skirt sections 36 and 37, the outer edges of which are defined by the parallel side edges 27 and 28 respectively. The convergence of lines of bend 32 and 33 is the same as that of lines 30 and 31.

Such blanks form units such as shown in Fig. 7 when they are bent along the lines 30, 31, 32 and 33.

The unit shown in Fig. 9, which is formed from a blank such as shown in Fig. 10, is essentially like that pictured in Fig. 7. The principal difference is that its midsection 40 is relatively wide.

In the unit shown in Fig. 11, which is formed by the blank shown in Fig. 12, there are two similar midsections converging or sloping to an apex 41 so that the covered corner may exhibit a more pointed appearance.

A rounded appearance at corners may be provided by using units such as shown in Fig. 13. The blanks from which such units may be formed are shown in Fig. 14. This unit differs from those illustrated in Figs. 7 to 11, in that the sections other than the two skirts 45 and 46 are merged into a single tapering roll-section 47. The type of section 47 is such that its outer periphery at the lap line *a—b* is twice the thickness of the material less than the inner periphery at the larger end.

Fig. 15 shows how units of the type illustrated in Fig. 7 may be advantageously employed in the covering of old metal roofs. Because of the upstanding seams formed in making the joints between adjacent edges of the sheets constituting a metal or, as it is generally termed, a "tin" roof, the repair or recovering of such roofs with prepared roofing has been a difficult and unsatisfactory matter. Ordinarily the seams are too high and too sharp to permit the usual types of prepared roofing to be laid directly upon and over them. They soon cut through the relatively soft prepared roofing material. Consequently, the usual practice has been to pound down and flatten the seams before laying the overlying covering of prepared roofing material. But this practice is unduly costly and, unless very carefully done, the seams may still project enough to cut through the overlying covering.

By the use of my corner units these difficulties are avoided. Thus, as shown in Fig. 15, the spaces between the seams 48 of the old roof may be overlaid with covering units of the standard types, such as strips 49 of roll roofing. The edges of these strips may come up almost to the seams of the underlying metal covering or they may overlap them. The strips may be anchored down by applying nails near enough to the edges so that they will be covered by the skirts of the corner units. After the strips are laid the gaps therebetween and the seams of the old roof are both covered by applying thereover corner units in overlapping relationship as heretofore described.

The bending of the units, to form therein the one or more corners, may be accomplished in various ways. Thus, for example, after being cut from the sheet of roofing material, the then flat blanks may be bent in a press equipped with complementary punch and die members having surfaces disposed at the proper angles. Or the blanks either during or after the process of cutting them from the sheet of roofing material, may be lightly scored along the lines of bend and subsequently bent by hand. Or it may be found sufficient in the formation of coated units merely to omit or remove narrow strips of the coating material long the lines of bend to render them, along such lines, sufficiently flexible relative to the remainder so that units may be readily bent by hand.

After the blanks are bent to form the desired shape of units, the units are retained in angular form against the natural tendency of the material to flatten until they are received on the job,—preferably until just before they are placed in position on the building. Figs. 17 and 18 show two satisfactory methods of sustaining the units to insure the retention of the desired bends or corners. As shown in Fig. 17, groups of the formed units, usually enough to constitute a practicable package, are stacked in nesting relation upon a support 50 which is shaped to conform to and fit the concave side of the units after they have been bent in the desired angles. The stack of nested units and the retainer form are then bound together in any suitable manner, as by one or more encircling wire loops 51, so as to insure that the units can not flatten out as it is their natural tendency to do, because of the inherent flexibility of the material,—particularly if the weather is warm. In the use of such retainer forms, convex units will be stacked with the coated surfaces on the outside or away from the form, while concave units will be stacked with the coated surfaces on the inside or toward the form.

Fig. 18 shows another method of retaining the units in pre-formed condition. According to this arrangement the units are stacked in a suitable container, such as a box 52, the width of which is just sufficient to accommodate the units in pre-bent condition. Of course, since the units would have to spread or increase in width in order to flatten, the sides of the box sustain them and insure their retention in the pre-bent form in which they are inserted.

It will be observed that by forming the unit with a plurality of bends, the bends individually may be less acute than the angle of the building corner to be covered thereby while cumulatively they may substantially conform to that angle. In other words, the flat sloping wall contacting sections which incline toward each other at substantially the angle of the corner to be covered (e. g., the pitch angle of the roof at ridge or valley) are connected by one or more truncating sections which join each other and the wall contacting sections at angles less acute than the building angle to be covered.

If desired, the lap line of the units may be indicated so as to insure that successive units are laid to provide the proper overlap or length to the weather. Thus, the side edges of each unit may be marked in any suitable manner, such as by the small projecting lugs 60 shown in Figs. 1 and 2 or by small recesses or cuts as shown at 61 in Figs. 5 and 6 to show the location of the imaginary line a—b.

Having illustrated and described several typical embodiments of my invention, what I claim and desire to secure by United States Letters Patent is as follows:

1. The method of preparing and applying a building covering unit from a sheet of prepared roofing material which at normal temperatures is incapable of retaining bends formed therein and at subnormal temperatures cannot be bent without injury, consisting of cutting a quadrilateral flat unit from a sheet of the material, bending the unit while warm to form a corner therein having approximately the angle to be permanently assumed when the unit is in place, while the unit is still bent packaging the same so that the corner thereof is maintained by the packaging against the natural tendency of the material to flatten, removing the unit from the package, and applying the unit in position on the building before the normal tendency to flatten substantially varies the angle into which the unit was bent.

2. The method of preparing and applying a building covering unit from a sheet of prepared roofing material which at normal temperatures is too flexible to retain bends formed therein and at subnormal temperatures cannot satisfactorily be bent, consisting of cutting a quadrilateral flat unit from a sheet of the material, bending the unit while warm to form a plurality of corners having angles which cumulatively approximate the permanent total angle the unit is to assume when placed, while the unit is thus bent packaging the same so that the corners formed therein are maintained by the packaging against the natural tendency of the material to flatten, separating the unit from the package, and placing the unit in position on the building before the normal tendency to flatten can substantially vary the angle into which the unit was bent.

3. The method of preparing and applying building-corner covering units from a sheet of flexible prepared roofing material which at normal temperatures is incapable of retaining bends formed therein and at subnormal temperatures cannot be satisfactorily bent, consisting of cutting flat unit-blanks from a sheet of the material, bending each unit-blank while it is warm to form a unit having a corner of approximately the angle to be assumed when the unit is placed on a building, before a unit has time to flatten stacking the same in corner-nesting relation with other like units, sustaining independently of themselves the stacked units in angular form against the natural tendency thereof to flatten, separating and removing units from the stack, and placing the removed units in position on the building before the natural tendency to flatten can substantially vary the angle into which each unit was bent.

EDWARD ROSCOE BLACK.